US011858115B1

(12) United States Patent
Sun

(10) Patent No.: US 11,858,115 B1
(45) Date of Patent: Jan. 2, 2024

(54) ASSEMBLING AND DISASSEMBLING-FACILITATED TOOL RACK

(71) Applicant: Shenzhen Dawn Model Technology Co., Ltd., Shenzhen (CN)

(72) Inventor: Changfei Sun, Shenzhen (CN)

( * ) Notice: Subject to any disclaimer, the term of this patent is extended or adjusted under 35 U.S.C. 154(b) by 0 days.

(21) Appl. No.: 17/869,989

(22) Filed: Jul. 21, 2022

(30) Foreign Application Priority Data

Jul. 18, 2022 (CN) ......................... 202221852422.8

(51) Int. Cl.
*B25H 3/04* (2006.01)
*A47B 47/00* (2006.01)
*A47F 7/00* (2006.01)
*A47B 87/02* (2006.01)
*A47B 81/00* (2006.01)

(52) U.S. Cl.
CPC ........... *B25H 3/04* (2013.01); *A47B 87/0223* (2013.01); *A47F 7/0028* (2013.01); *A47B 81/00* (2013.01)

(58) Field of Classification Search
CPC ..... B25H 3/04; A47F 7/0028; A47B 87/0023; A47B 87/0215; A47B 57/26; A47B 87/0246; A47B 81/00
See application file for complete search history.

(56) References Cited

U.S. PATENT DOCUMENTS 4,641,755 A * 2/1987 Oliver .................. A47B 81/005 89/34
5,011,028 A * 4/1991 Sweeney ............... A47F 7/0028 211/207
5,964,360 A * 10/1999 Hwang .............. A47B 87/0215 211/186
5,971,174 A * 10/1999 Strock .................. A47B 87/008 211/186
6,398,045 B1 * 6/2002 Chao ...................... A47F 7/0028 211/60.1
6,796,440 B2 * 9/2004 Wang ..................... A47F 7/0028 211/183
6,811,127 B1 * 11/2004 Shiao ........................ B25H 3/04 211/DIG. 1
6,983,854 B2 * 1/2006 Pleiman ................... B25H 3/04 211/70.6
7,063,218 B2 * 6/2006 Pleiman ................... B25H 3/04 211/70.6
2003/0234230 A1 * 12/2003 Wang ..................... A47F 7/0028 211/60.1

(Continued)

FOREIGN PATENT DOCUMENTS

GB 2336102 A * 10/1999 ......... A47B 87/0215

*Primary Examiner* — Kimberley S Wright

(57) ABSTRACT

The present disclosure discloses an assembling and disassembling-facilitated tool rack. The tool rack includes a base, supporting rods, a top plate, supporting plates and screws. The base is provided with several first threaded holes. Bottoms of the supporting rods are provided with threaded columns. The top plate is provided with first through holes. The supporting plates are provided with second through holes. The supporting plates are clamped between adjacent upper and lower supporting rods. The screws are in threaded connection to the second threaded holes of the supporting rods on the uppermost layer. The top plate is clamped between the screws and the supporting rods on the uppermost layer.

15 Claims, 6 Drawing Sheets

(56) References Cited

U.S. PATENT DOCUMENTS

| | | | | |
|---|---|---|---|---|
| 2004/0188367 | A1 * | 9/2004 | Pleiman | B25H 3/04 211/70.6 |
| 2007/0272635 | A1 * | 11/2007 | Cuadra, Jr. | D04B 3/06 211/78 |
| 2012/0285912 | A1 * | 11/2012 | Koessl | A47B 47/045 211/70.6 |

* cited by examiner

ASSEMBLING AND DISASSEMBLING-FACILITATED TOOL RACK

CROSS REFERENCE TO RELATED APPLICATION

This application claims priority benefit of Chinese Utility Model Application No. 202221852422.8, filed on Jul. 18, 2022, and the entire contents of which are incorporated herein by reference.

TECHNICAL FIELD

The present disclosure relates to the technical field of tool supporting frame, in particular to an assembling and disassembling-facilitated tool rack.

BACKGROUND

In many conventional industrial operations, a workbench or a multi-layer rack is generally used to place tools, so that users can easily pick and place the tools, which can effectively avoid pollution and loss caused by random placement of the tools.

There are generally various types of tool supporting frames such as an integrally formed workbench and a detachable tool rack. The detachable tool rack is favored by the majority of users due to its convenience in transportation and portability. However, it is relatively complicated to remove a detachable tool rack on the market at present, especially a multilayer detachable tool rack. During assembling and disassembling, each part needs to be accurately positioned before it is fixed with fasteners such as screws, so the tool rack is used troublesome to use.

SUMMARY

In order to overcome the disadvantage of the existing tool rack, the present disclosure provides an assembling and disassembling-facilitated tool rack which is simple in structure, convenient to plug and good in use effect.

The present disclosure adopts the following technical solution: an assembling and disassembling-facilitated tool rack including a base, several supporting rods, a top plate, several supporting plates, and screws, wherein the base is provided with several first threaded holes; bottoms of the supporting rods are provided with threaded columns; tops of the supporting rods are provided with mounting platforms which are provided with second threaded holes; the several supporting rods are connected in sequence from top to bottom; the threaded columns of the supporting rods on the bottommost layer are in threaded connection to the first threaded holes; the threaded columns of the supporting rods on adjacent upper layer are in threaded connection to the second threaded holes of the supporting rods on adjacent lower layer; the top plate is provided with first through holes used for plugging the mounting platforms; the supporting plates are provided with second through holes used for plugging the mounting platforms; the supporting plates are clamped between adjacent upper and lower supporting rods; the screws are in threaded connection to the second threaded holes of the supporting rods on the uppermost layer; and the top plate is clamped between the screws and the supporting rods on the uppermost layer.

Further, the top plate is further provided with first accommodating through holes that runs through the top plate; and the first accommodating through holes are used for plugging tools.

Further, the supporting plates are further provided with second accommodating through holes that run through the supporting plates; the second accommodating through holes correspond to the first accommodating through holes; and the second accommodating through holes are used for plugging tools passing through the first accommodating through holes.

Further, two groups of the second accommodating through holes on the upper and lower adjacent supporting plates correspond to each other one by one.

Further, an upper surface of the base is provided with first accommodating grooves.

Further, a magnetic layer is attached in each of the first accommodating grooves.

Further, an upper surface of the base is provided with second accommodating grooves; and the second accommodating grooves correspond to the first accommodating through holes.

Further, an upper surface of the base is provided with third accommodating grooves.

Further, third accommodating through holes are further formed in the top plate.

Further, an upper surface of the base is provided with fourth accommodating grooves; and the fourth accommodating grooves correspond to the third accommodating through holes.

The present disclosure adopts the following technical solution: an assembling and disassembling-facilitated tool rack including a base, several supporting rods, a top plate, several supporting plates, and screws, wherein the base is provided with several first threaded holes; bottoms of the supporting rods are provided with threaded columns; tops of the supporting rods are provided with mounting platforms which are provided with second threaded holes; the threaded columns are in threaded connection to the first threaded holes; the top plate is provided with first through holes used for plugging the mounting platforms; the screws are in threaded connection to the second threaded holes; and the top plate is clamped between the screws and the supporting rods.

Further, the top plate is further provided with first accommodating through holes that runs through the top plate; and the first accommodating through holes are used for plugging tools.

Further, an upper surface of the base is provided with first accommodating grooves.

Further, a magnetic layer is attached in each of the first accommodating grooves.

Further, an upper surface of the base is provided with second accommodating grooves; and the second accommodating grooves correspond to the first accommodating through holes.

Further, an upper surface of the base is provided with third accommodating grooves.

Further, third accommodating through holes are further formed in the top plate.

Further, an upper surface of the base is provided with fourth accommodating grooves; and the fourth accommodating grooves correspond to the third accommodating through holes.

The present disclosure has the beneficial effects: by the arrangement of the above structure, during assembling, the threaded columns at the bottoms of the supporting rods are in threaded connection to the first threaded holes, thus fixing the supporting rods to the base; the supporting plates are then aligned with the supporting rods, so that the mounting platforms on the supporting rods are plugged into the second through holes, which can effectively limit the supporting plates; at this time, side walls of the mounting platforms are abutted against inner walls of the second through hole to prevent relative movement between the supporting plates and the supporting rods, which facilitates further mounting; the threaded columns of other supporting rods are then threaded connection to the second threaded holes; at this time, the upper and lower adjacent supporting rods are respectively abutted against upper and lower surfaces of the supporting plates to further position the supporting plates, which makes the connection more stable; the screws are in threaded connection to the second threaded holes; at this time, lower surfaces of screw heads are abutted against an upper surface of the top plate, and the upper surfaces of the supporting rods adjacent to the mounting platforms are abutted against a lower surface of the top plate, so that the top plate is clamped between the screws and the supporting rods, and can be thus fixed; a user conveniently carries out assembling; the top plate can be effectively fixed; and the stability of the tool rack is improved.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE EMBODIMENTS

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

Figure 1:
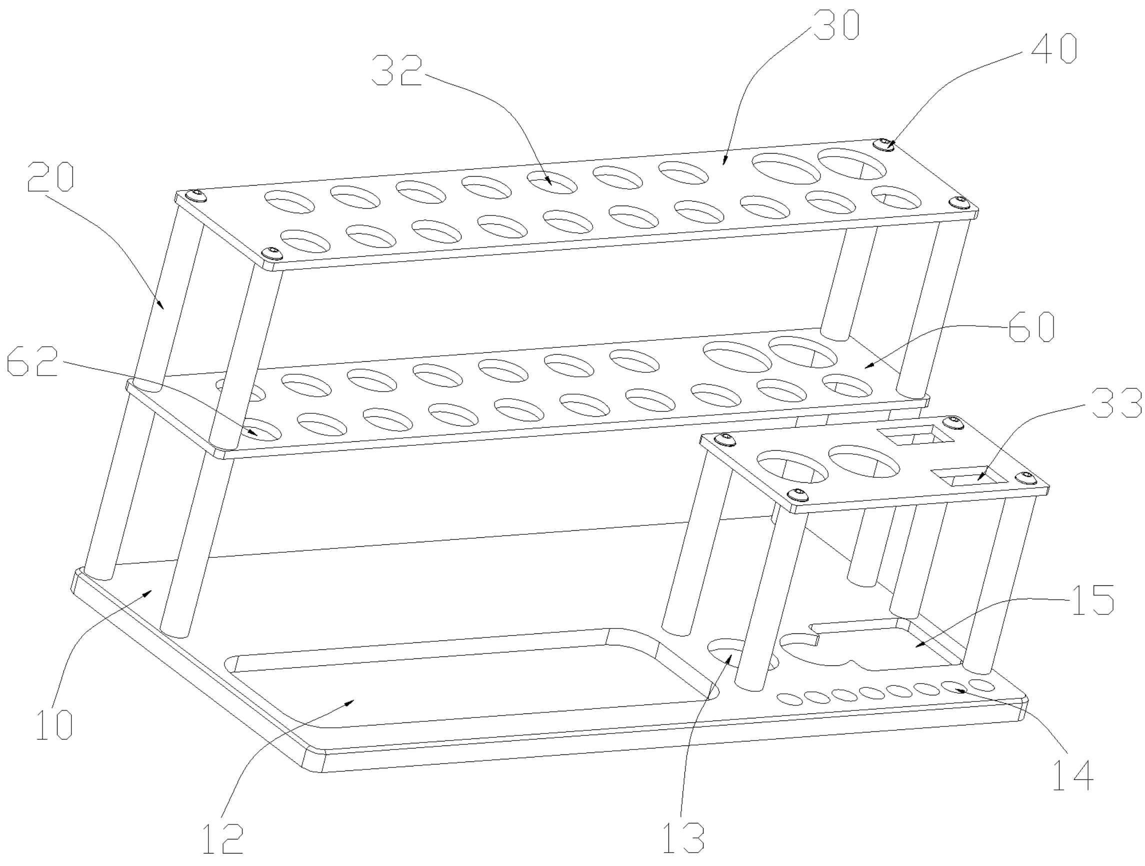
FIG. 1 is a schematic diagram of an entire structure of a tool rack of the present disclosure.
Figure 2:
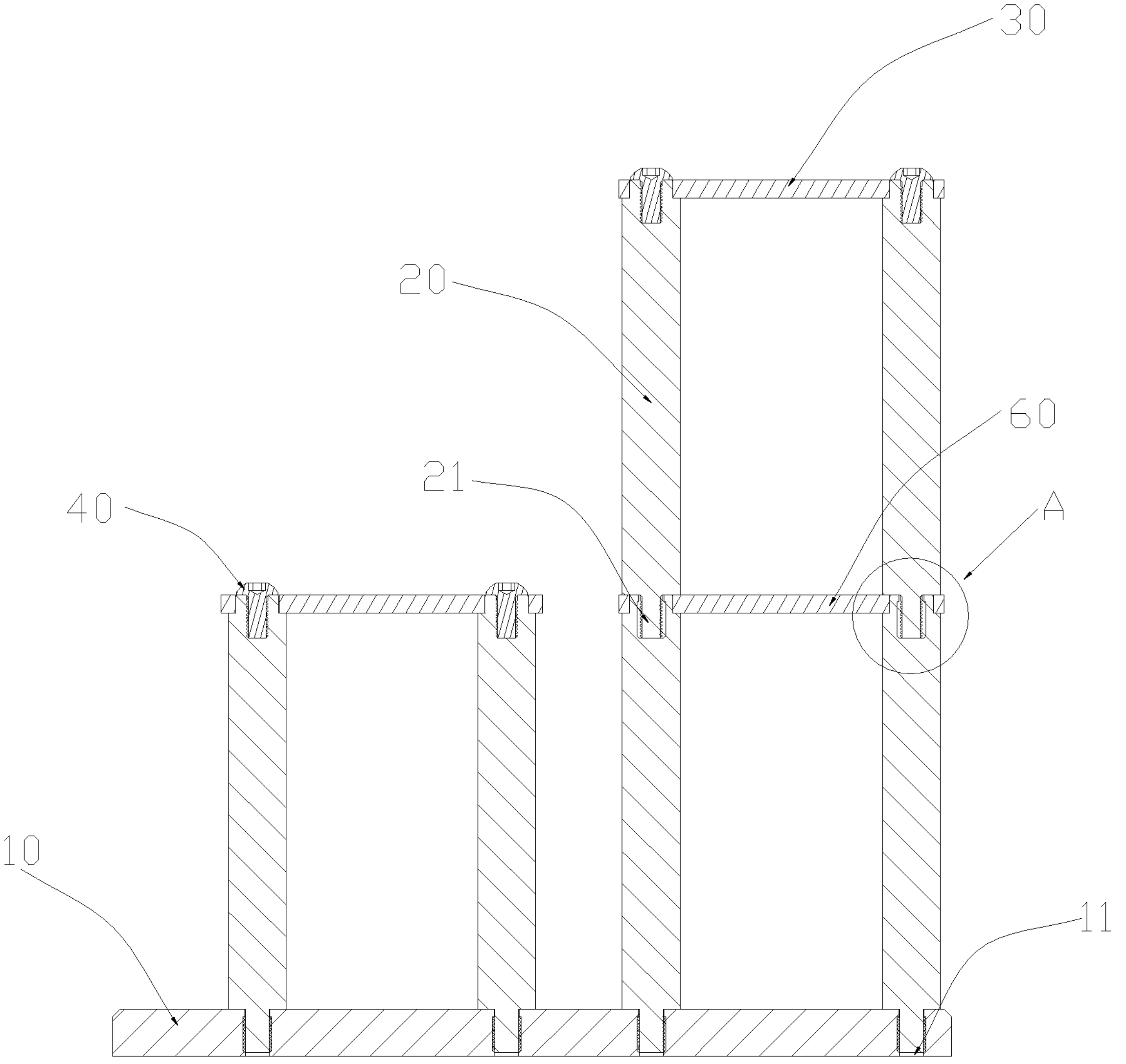
FIG. 2 is a schematic diagram of a first sectional structure of a tool rack of the present disclosure.
Figure 3:
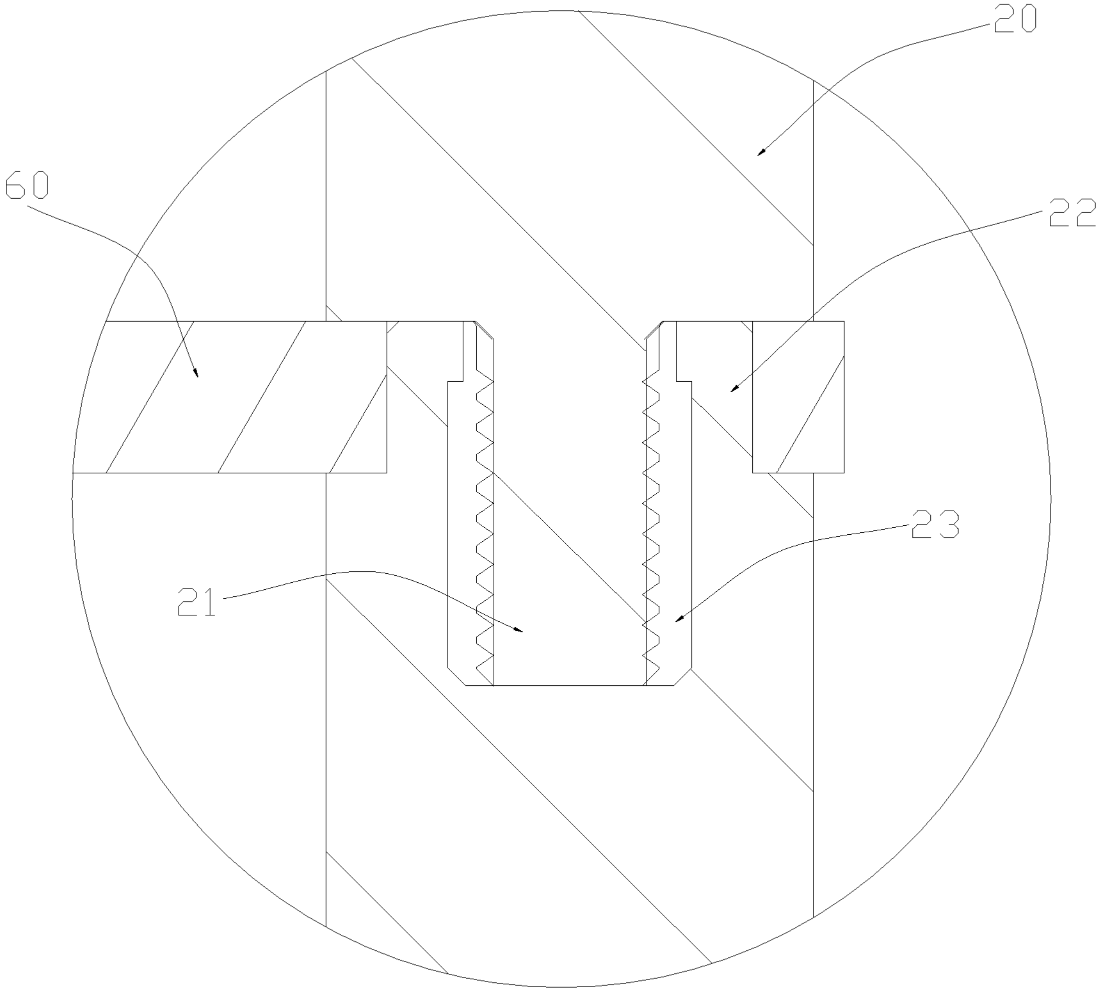
FIG. 3 is an enlarged diagram of circle A in FIG. 2.
Figure 4:
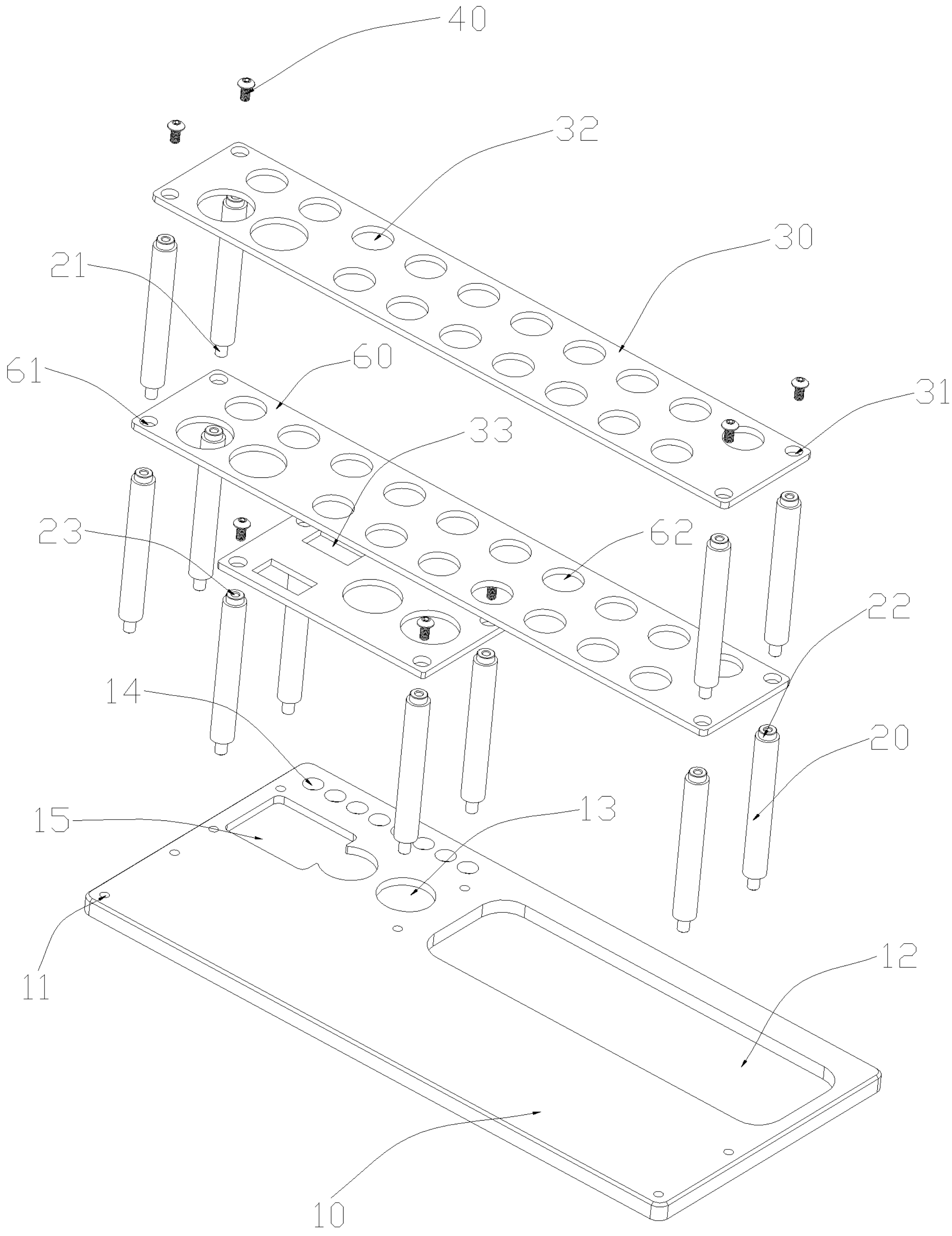
FIG. 4 is a schematic diagram of an exploded structure of a first angle of a tool rack of the present disclosure.
Figure 5:
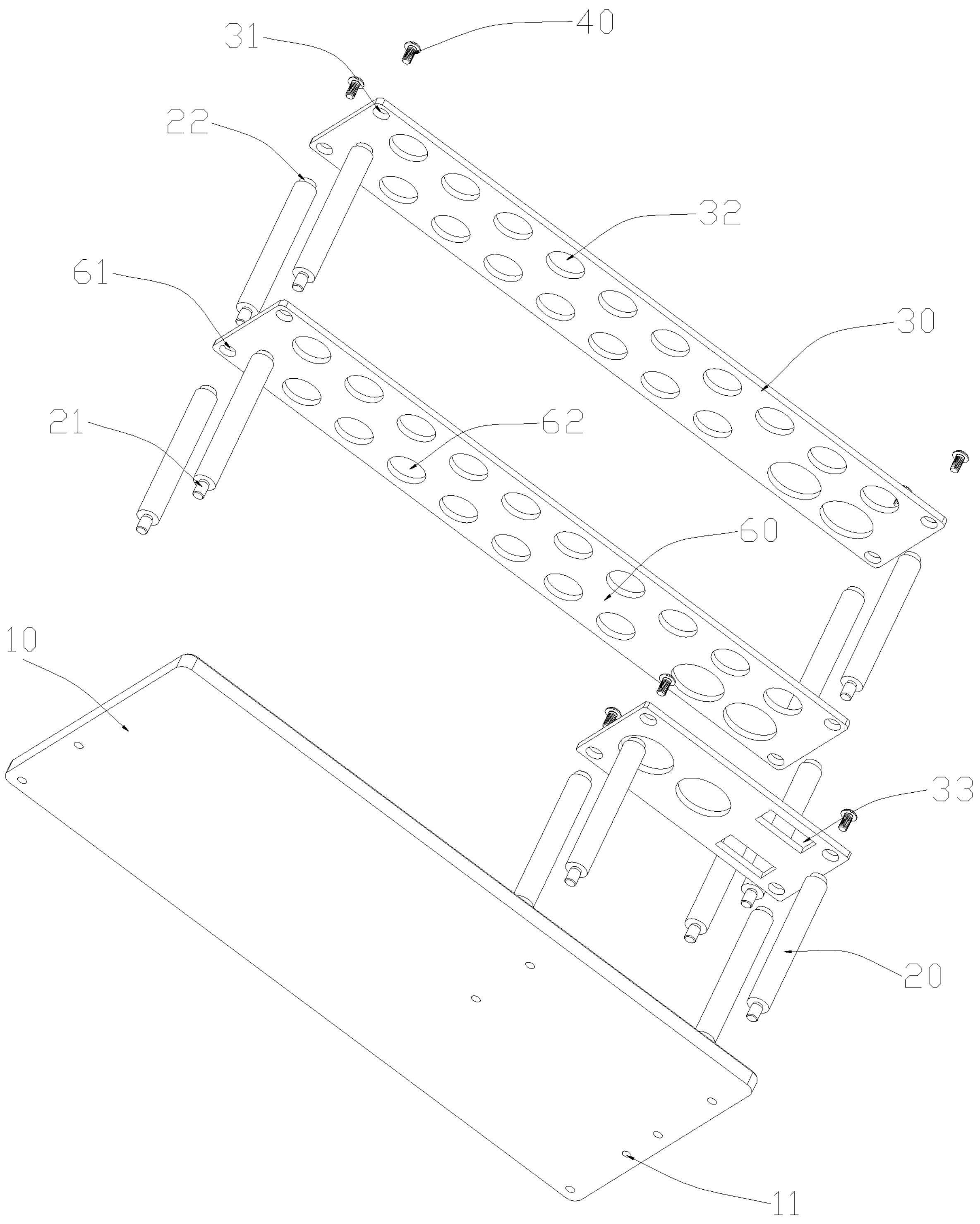
FIG. 5 is a schematic diagram of an exploded structure of a second angle of a tool rack of the present disclosure.
Figure 6:
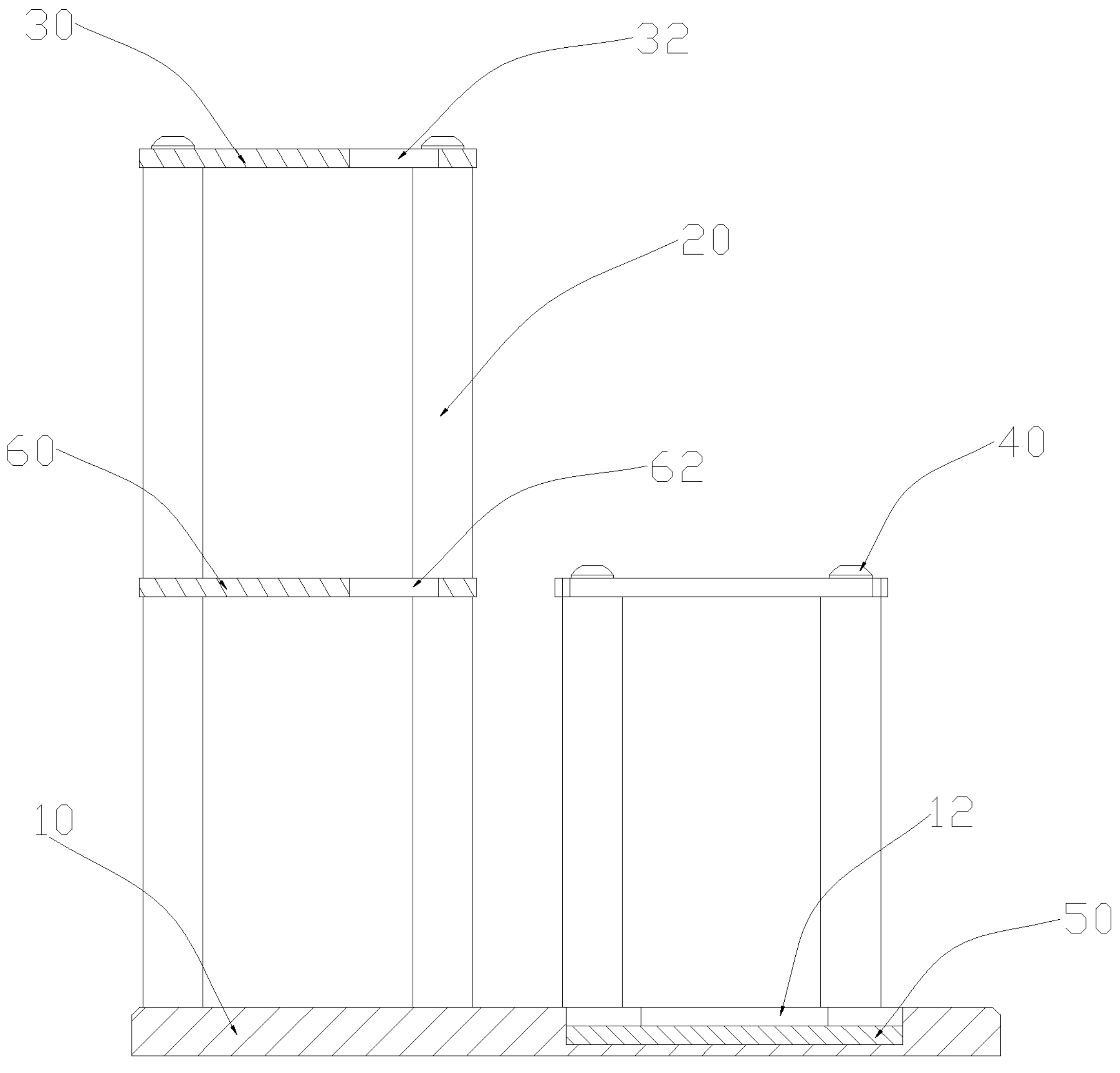
FIG. 6 is a schematic diagram of a second sectional structure of a tool rack of the present disclosure.

Referring to FIG. 1 to FIG. 6, an assembling and disassembling-facilitated tool rack includes a base 10, several supporting rods 20, a top plate 30, several supporting plates 60, and screws 40.

The base 10 is provided with several first threaded holes 11.

Bottoms of the supporting rods 20 are provided with threaded columns 21; tops of the supporting rods 20 are provided with mounting platforms 22 which are provided with second threaded holes 23; the several supporting rods 20 are connected in sequence from top to bottom; the threaded columns 21 of the supporting rods 20 on the bottommost layer are in threaded connection to the first threaded holes 11; and the threaded columns 21 of the supporting rods 20 on adjacent upper layers are in threaded connection to the second threaded holes 23 of the supporting rods 20 on adjacent lower layers.

The top plate 30 is provided with first through holes 31 used for plugging the mounting platforms 22.

The supporting plates 60 are provided with second through holes 61 used for plugging the mounting platforms 22; and the supporting plates 60 are clamped between adjacent upper and lower supporting rods 20.

The screws 40 are in threaded connection to the second threaded holes 23 of the supporting rods 20 on the uppermost layer; and the top plate 30 is clamped between the screws 40 and the supporting rods 20 on the uppermost layer.

By the arrangement of the above structure, during assembling, the threaded columns at the bottoms of the supporting rods are in threaded connection to the first threaded holes, thus fixing the supporting rods to the base; the supporting plates are then aligned with the supporting rods, so that the mounting platforms on the supporting rods are plugged into the second through holes, which can effectively limit the supporting plates; at this time, side walls of the mounting platforms are abutted against inner walls of the second through hole to prevent relative movement between the supporting plates and the supporting rods, which facilitates further mounting; the threaded columns of other supporting rods are then threaded connection to the second threaded holes; at this time, the upper and lower adjacent supporting rods are respectively abutted against upper and lower surfaces of the supporting plates to further position the supporting plates, which makes the connection more stable; the screws are in threaded connection to the second threaded holes; at this time, lower surfaces of screw heads are abutted against an upper surface of the top plate, and the upper surfaces of the supporting rods adjacent to the mounting platforms are abutted against a lower surface of the top plate, so that the top plate is clamped between the screws and the supporting rods, and can be thus fixed; a user conveniently carries out assembling; the top plate can be effectively fixed; and the stability of the tool rack is improved.

The top plate 30 is further provided with first accommodating through holes 32 that run through the top plate 30; and the first accommodating through holes 32 are used for plugging tools. By the arrangement of the above structure, during use, a user can plug tools and parts such as a screwdriver, a sleeve, a shock absorber and an adapter into the first accommodating through holes. Preferably, the first accommodating through holes may have different sizes, such as a diameter of 12 MM. The first accommodating through holes with this aperture can be used for plugging the tools and parts such as a screwdriver, a sleeve and a shock absorber. The diameters of some of the first accommodating through holes may be 17 MM, so these first accommodating through holes can be used for plugging the tools and parts such as an adapter. The user can plug products with different diameters into the first accommodating through holes with the corresponding apertures according to needs. It is convenient for the user to collect and use various tools and parts. The product convenience and adaptability are improved, and the use experience of the user is enhanced.

The supporting plates 60 are further provided with second accommodating through holes 62 that run through the supporting plates 60; the second accommodating through holes 62 correspond to the first accommodating through holes 32; and the second accommodating through holes 62 are used for plugging tools passing through the first accommodating through holes 32. By the arrangement of the above structure, the second accommodating through holes correspond to the first accommodating through hole, which can further support the tools passing through the first accommodating through holes and improve the stability of the tool rack.

Two groups of the second accommodating through holes 62 on the upper and lower adjacent supporting plates 60 correspond to each other one by one. By the arrangement of the above structure, the first accommodating holes on the upper and lower adjacent top plates correspond to each other. When tools and parts such as a screwdriver, a sleeve, a shock absorber and the adapter are plugged into the first accommodating through holes, the upper and lower distributed first accommodating through holes respectively support different portions of the above-mentioned tools and parts, so that the above-mentioned tools and parts can be fixed more stably, and the stability of the tool rack is improved.

An upper surface of the base 10 is provided with first accommodating grooves 12. By the arrangement of the above structure, the first accommodating grooves are used for accommodating parts such as a screw and a screw cap. During use, a user can place a part in each first accommodating groove, so that parts such as a screw and a screw cap can be effectively collected, and accidental loss of the parts can be prevented; meanwhile, the user can also conveniently take the parts; the convenience of the tool rack is improved; and the loss of the user can be effectively reduced, and the working efficiency of the user is improved.

A magnetic layer 50 is attached into each of the first accommodating grooves 12. By the arrangement of the above structure, the magnetic layer is attached into each of the first accommodating grooves, so that parts such as a screw and a screw cap placed in the first accommodating grooves can be effectively sucked, and the above-mentioned parts are prevented from falling off and are collected and stored more effectively. The stability and convenience of the tool rack are improved, and a user picks and places the parts conveniently.

An upper surface of the base 10 is provided with second accommodating grooves 13; and the second accommodating grooves 13 correspond to the first accommodating through holes 32. By the arrangement of the above structure, the second accommodating grooves correspond to the first accommodating through holes. During use, parts such as a reamer and a bearing disassembler pass through the first accommodating through holes and are plugged into the second accommodating grooves; upper and lower portions of parts such as a reamer and a bearing disassembler are respectively abutted against the first accommodating through holes and the second accommodating grooves, so that the parts such as a reamer and a bearing disassembler are placed on the took rack more stably; the stability of the tool rack is improved; the parts such as a reamer and a bearing disassembler on the tool rack are prevented from falling off; and the use experience of a user is enhanced.

An upper surface of the base 10 is provided with third accommodating grooves 14. By the arrangement of the above structure, the upper surface of the base is provided with several third accommodating grooves which are used for accommodating parts and tools such as a screwdriver head. During use, a user can replace a screwdriver head at any time according to a need, so as to use a screwdriver tool more conveniently. Different types of screwdriver heads can be plugged in the third accommodating grooves. On the one hand, the screwdriver heads can be conveniently collected; and on the other hand, the user can also be allowed to conveniently use the suitable screwdriver heads, so that the convenience of the tool rack is improved.

Third accommodating through holes 33 are also formed in the top plate 30. By the arrangement of the above structure, the third accommodating through holes are used for accommodating tools such as nipper pliers, diagonal pliers and shock-proof pliers. Preferably, the third accommodating through holes may be rectangular. During use, side walls of the tools such as nipper pliers, diagonal pliers and shock-proof pliers are respectively abutted against side walls of the third accommodating through holes, so that the tools such as nipper pliers, diagonal pliers and shock-proof pliers can be stably fixed, and a user can conveniently use these tools.

The upper surface of the base 10 is provided with fourth accommodating grooves 15; and the fourth accommodating grooves 15 correspond to the third accommodating through holes 33. By the arrangement of the above structure, heads of the tools such as nipper pliers, diagonal pliers and shock-proof pliers pass through the third accommodating through holes and are abutted against the fourth accommodating grooves, so that the tools such as nipper pliers, diagonal pliers and shock-proof pliers are stressed more uniformly and are placed more stably. The stability of the tool rack can be effectively improved, and the use experience of a user is enhanced.

Referring to FIG. 1 to FIG. 6, an assembling and disassembling-facilitated tool rack includes a base 10, supporting rods 20, a top plate 30, supporting plates 60, and screws 40.

The base 10 is provided with several first threaded holes 11.

Bottoms of the supporting rods 20 are provided with threaded columns 21; tops of the supporting rods 20 are provided with mounting platforms 22 which are provided with second threaded holes 23; and the threaded columns 21 are in threaded connection to the first threaded holes 11.

The top plate 30 is provided with first through holes 31 used for plugging the mounting platforms 22.

The screws 40 are in threaded connection to the second threaded holes 23; and the top plate 30 is clamped between the screws 40 and the supporting rods 20.

By the arrangement of the above structure, during assembling, the threaded columns at the bottoms of the supporting rods are in threaded connection to the first threaded holes, thus fixing the supporting rods to the base; the top plate is then aligned with the supporting rods, so that the mounting platforms on the supporting rods are plugged into the first through holes, which can effectively limit the top plate; at this time, side walls of the mounting platforms are abutted against inner walls of the first through hole to prevent relative movement between the top plate and the supporting rods, which facilitates further mounting; the screws are in threaded connection to the second threaded holes; at this time, lower surfaces of screw heads are abutted against an upper surface of the top plate, and the upper surfaces of the supporting rods adjacent to the mounting platforms are abutted against a lower surface of the top plate, so that the top plate is clamped between the screws and the supporting rods, and can be thus fixed; a user conveniently carries out assembling; the top plate can be effectively fixed; and the stability of the tool rack is improved.

The top plate 30 is further provided with first accommodating through holes 32 that run through the top plate 30; and the first accommodating through holes 32 are used for plugging tools. By the arrangement of the above structure, during use, a user can plug tools and parts such as a screwdriver, a sleeve, a shock absorber and an adapter into the first accommodating through holes. Preferably, the first accommodating through holes may have different sizes, such as a diameter of 12 MM. The first accommodating through holes with this aperture can be used for plugging the tools and parts such as a screwdriver, a sleeve and a shock absorber. The diameters of some of the first accommodating through holes may be 17 MM, so these first accommodating through holes can be used for plugging the tools and parts such as an adapter. The user can plug products with different diameters into the first accommodating through holes with the corresponding apertures according to needs. It is convenient for the user to collect and use various tools and parts. The product convenience and adaptability are improved, and the use experience of the user is enhanced.

An upper surface of the base 10 is provided with first accommodating grooves 12. By the arrangement of the above structure, the first accommodating grooves are used for accommodating parts such as a screw and a screw cap. During use, a user can place a part in each first accommodating groove, so that parts such as a screw and a screw cap can be effectively collected, and accidental loss of the parts can be prevented; meanwhile, the user can also conveniently take the parts; the convenience of the tool rack is improved; and the loss of the user can be effectively reduced, and the working efficiency of the user is improved.

A magnetic layer 50 is attached into each of the first accommodating grooves 12. By the arrangement of the above structure, the magnetic layer is attached into each of the first accommodating grooves, so that parts such as a screw and a screw cap placed in the first accommodating grooves can be effectively sucked, and the above-mentioned parts are prevented from falling off and are collected and stored more effectively. The stability and convenience of the tool rack are improved, and a user picks and places the parts conveniently.

An upper surface of the base 10 is provided with second accommodating grooves 13; and the second accommodating grooves 13 correspond to the first accommodating through holes 32. By the arrangement of the above structure, the second accommodating grooves correspond to the first accommodating through holes. During use, parts such as a reamer and a bearing disassembler pass through the first accommodating through holes and are plugged into the second accommodating grooves; upper and lower portions of parts such as a reamer and a bearing disassembler are respectively abutted against the first accommodating through holes and the second accommodating grooves, so that the parts such as a reamer and a bearing disassembler are placed on the took rack more stably; the stability of the tool rack is improved; the parts such as a reamer and a bearing disassembler on the tool rack are prevented from falling off; and the use experience of a user is enhanced.

An upper surface of the base 10 is provided with third accommodating grooves 14. By the arrangement of the above structure, the upper surface of the base is provided with several third accommodating grooves which are used for accommodating parts and tools such as a screwdriver head. During use, a user can replace a screwdriver head at any time according to a need, so as to use a screwdriver tool more conveniently. Different types of screwdriver heads can be plugged in the third accommodating grooves. On the one hand, the screwdriver heads can be conveniently collected; and on the other hand, the user can also be allowed to conveniently use the suitable screwdriver heads, so that the convenience of the tool rack is improved.

Third accommodating through holes 33 are also formed in the top plate 30. By the arrangement of the above structure, the third accommodating through holes are used for accommodating tools such as nipper pliers, diagonal pliers and shock-proof pliers. Preferably, the third accommodating through holes may be rectangular. During use, side walls of the tools such as nipper pliers, diagonal pliers and shock-proof pliers are respectively abutted against side walls of the third accommodating through holes, so that the tools such as nipper pliers, diagonal pliers and shock-proof pliers can be stably fixed, and a user can conveniently use these tools.

The upper surface of the base 10 is provided with fourth accommodating grooves 15; and the fourth accommodating grooves 15 correspond to the third accommodating through holes 33. By the arrangement of the above structure, heads of the tools such as nipper pliers, diagonal pliers and shock-proof pliers pass through the third accommodating through holes and are abutted against the fourth accommodating grooves, so that the tools such as nipper pliers, diagonal pliers and shock-proof pliers are stressed more uniformly and are placed more stably. The stability of the tool rack can be effectively improved, and the use experience of a user is enhanced.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

The invention claimed is:

1. An assembling and disassembling-facilitated tool rack, comprising a base, a first supporting structure, wherein the first supporting structure comprises a plurality of supporting rods, a first top plate, a plurality of supporting plates, and screws, wherein the base is provided with a plurality of first threaded holes;

a bottom of each of the plurality of supporting rods is provided with a threaded column; a top of the plurality of supporting rods is provided with a mounting platform which is provided with a second threaded hole; the a plurality of supporting rods are connected in sequence from top to bottom to form a plurality of supporting layers, each of the plurality of supporting layers comprises multiple supporting rods; the threaded columns of the multiple supporting rods on the bottommost layer of the plurality of supporting layers are in threaded connection to the first threaded holes; the threaded columns of the supporting rods on each of other layers of the plurality of supporting layers are in threaded connection to the second threaded holes of the multiple supporting rods on an adjacent lower layer of the plurality of supporting layers;

the first top plate is provided with first through holes used for plugging the mounting platforms;

the plurality of supporting plates are provided with second through holes used for plugging the mounting platforms; each of the plurality of supporting plates is clamped between the multiple supporting rods on two adjacent layers of the plurality of supporting layers;

the screws are in threaded connection to the second threaded holes of the supporting rods on the uppermost layer; and the first top plate is clamped between the screws and the supporting rods on the uppermost layer;

wherein the tool rack further comprises a second supporting structure arranged on the base where the first supporting structure is not arranged, wherein the second supporting structure comprises multiple supporting rods and a second top plate mounted on the multiple supporting rods, the second top plate defines third accommodating through holes, an upper surface of the base defines a fourth accommodating groove correspond to the third accommodating through holes; wherein the third accommodating through holes comprises through holes in at least two different shapes, the fourth accommodating groove comprises a rectangular portion and a circular portion communicated with the rectangular portion.

2. The tool rack according to claim 1, wherein the first top plate is further provided with first accommodating through holes that runs through the top plate; and the first accommodating through holes are used for plugging tools.

3. The tool rack according to claim 2, wherein the plurality of supporting plates are further provided with second accommodating through holes that run through the plurality of supporting plates; the second accommodating through holes correspond to the first accommodating through holes; and the second accommodating through holes are used for plugging tools passing through the first accommodating through holes.

4. The tool rack according to claim 3, wherein the second accommodating through holes on the supporting plate on an upper layer of the plurality of supporting layers correspond to the second accommodating through holes on the supporting plate on a lower layer of the plurality of supporting layers one by one.

5. The tool rack according to claim 1, wherein an upper surface of the base where the first supporting structure and the second supporting structure are not arranged is provided with first accommodating grooves.

6. The tool rack according to claim 5, wherein a magnetic layer is attached in each of the first accommodating grooves.

7. The tool rack according to claim 2, wherein an upper surface of the base is provided with second accommodating grooves; and the second accommodating grooves correspond to the first accommodating through holes.

8. The tool rack according to claim 5, wherein an upper surface of the base is provided with third accommodating grooves each with a size smaller than that of the first accommodating groove.

9. An assembling and disassembling-facilitated tool rack, comprising a base, a first supporting structure and a second supporting structure detachably mounted on the base, wherein the first supporting structure comprises two first supporting layers, each first supporting layer comprises a plurality of supporting rods and a supporting plate detachably mounted on the plurality of supporting rods, the supporting plate of each first supporting layer defines a plurality of first accommodating through holes for plugging tools;

the second supporting structure comprises a plurality of supporting rods and a top plate detachably mounted on the plurality of supporting rods, the top plate defines second accommodating through holes;

an upper surface of the base where the second supporting structure is arranged is provided with a first accommodating groove corresponding to the second accommodating through holes, wherein the second accommodating through holes comprises through holes in at least two different shapes, the first accommodating groove comprises a rectangular portion and a circular portion communicated with the rectangular portion.

10. The tool rack according to claim 9, wherein an upper surface of the base where the first supporting structure and the second supporting structure are not arranged is provided with a second accommodating groove.

11. The tool rack according to claim 10, wherein a magnetic layer is attached in each of the second accommodating grooves.

12. The tool rack according to claim 9, wherein an upper surface of the base is provided with third accommodating grooves; and the third accommodating grooves correspond to the first accommodating through hoes.

13. The tool rack according to claim 10, wherein an upper surface of the base is provided with fourth accommodating grooves each with a size smaller than that of the second accommodating groove.

14. The tool rack according to claim 5, wherein the first supporting structure extends along a first direction, the second supporting structure and the first accommodating grooves are arranged along the first direction.

15. The tool rack according to claim 10, wherein the first supporting structure extends along a first direction, the second supporting structure and the second accommodating grooves are arranged along the first direction.

* * * * *